(12) United States Patent
Myers et al.

(10) Patent No.: US 7,584,972 B2
(45) Date of Patent: Sep. 8, 2009

(54) GOLF BAG

(75) Inventors: Chris Myers, Welwyn Garden City (GB); Tony Johnson, Denby Dale (GB); Howard Smith, Denby Dale (GB)

(73) Assignee: 365 Golf Ltd (GB)

( * ) Notice: Subject to any disclaimer, the term of this patent is extended or adjusted under 35 U.S.C. 154(b) by 617 days.

(21) Appl. No.: 11/324,246

(22) Filed: Jan. 4, 2006

(65) Prior Publication Data

US 2007/0126194 A1 Jun. 7, 2007

(30) Foreign Application Priority Data

Dec. 2, 2005 (GB) ................................. 0524632.7

(51) Int. Cl.
*B62B 1/04* (2006.01)
(52) U.S. Cl. ................ 280/47.17; 280/47.131; 280/47.18
(58) Field of Classification Search ............ 280/47.131, 280/47.15, 47.16, 47.17, 47.18, 47.2, 47.21, 280/47.22, 47.23, 47.24, 47.26
See application file for complete search history.

(56) References Cited

U.S. PATENT DOCUMENTS

| | | | | |
|---|---|---|---|---|
| 1,744,414 A | * | 1/1930 | Pflaum | 280/47.33 |
| 2,629,609 A | * | 2/1953 | Wilson | 280/655 |
| 4,153,264 A | * | 5/1979 | Pfister | 280/38 |
| 4,648,612 A | | 3/1987 | Park | |
| 4,792,152 A | * | 12/1988 | Carolan | 280/47.26 |
| 4,900,043 A | | 2/1990 | Kho | |
| 5,193,842 A | * | 3/1993 | Fontenot | 280/645 |
| 5,351,983 A | * | 10/1994 | Descalo | 280/646 |
| 6,168,123 B1 | * | 1/2001 | Stein et al. | 248/96 |
| 6,202,808 B1 | | 3/2001 | Sadow | |
| 6,454,281 B1 | * | 9/2002 | Pearson | 280/47.26 |
| 6,460,867 B2 | * | 10/2002 | Sciulli | 280/47.26 |
| 6,561,527 B2 | * | 5/2003 | Spadino | 280/47.26 |
| 6,598,889 B1 | * | 7/2003 | Su | 280/47.26 |
| 7,114,730 B2 | * | 10/2006 | Cheldin | 280/47.24 |
| 7,416,195 B2 | * | 8/2008 | Zwack | 280/47.24 |

FOREIGN PATENT DOCUMENTS

DE 29922082 U1 4/2000

OTHER PUBLICATIONS

International Search Report (5 pages) from ISA, corresponding to PCT/GB2006/004506, mailed Jul. 18, 2007.
Written Opinion (9 pages) from ISA,, corresponding to PCT/GB2006/004506, mailed Jul. 18, 2007.

* cited by examiner

*Primary Examiner*—Christopher P Ellis
*Assistant Examiner*—John D Walters
(74) *Attorney, Agent, or Firm*—Sheridan Ross P.C.

(57) ABSTRACT

A golf bag includes a base adapted to receive a ground-rolling device. The ground-rolling device is configured to be detachably connectable with the base. The ground-rolling device includes an axle provided with wheels located substantially at each end of the axle. When the ground-rolling device is connected to the base, the wheels project laterally from either side of the base.

17 Claims, 10 Drawing Sheets

GOLF BAG FITTED WITH WHEELS, EXTENDED FOOT PLATE, EXTENDED FOOT EXTENSION

GOLF BAG WHEELS REMOVED FOOT PLATE RETRACTED, FOOT EXTENSION RETRACTED

GOLF BAG

The present application claims priority under 35 U.S.C. §119 to United Kingdom Application Ser. No. 0524632.7, filed Dec. 2, 2005, the entire contents of which are hereby incorporated by reference herein.

BACKGROUND

1. Field of the Invention

The present invention relates to an apparatus in the form of a bag, and, in particular, to a stand/carry golf bag with wheels.

2. Background Information

Conventionally, wheels can be provided for golf bags by providing a frame or a trolley to which the wheels are fitted and upon which a golfer places their golf bag, such that the bag can then be pulled or pushed along the ground. If a golfer uses such a frame or trolley, the golfer is restricted to transporting their bag along a designated path around a golf course. Once on a frame or trolley, the bag becomes heavy and cumbersome to carry. Although golfers who simply carry their bags are not restricted to those designated paths, they are restricted to carrying their bag around the whole course.

It is therefore an object of the invention to provide a bag that can be both pulled or carried by the golfer while on the golf course by means of a simple adaptation that can be made during play.

It is a further object of the invention that the bag can be placed in a free-standing position on the ground regardless of whether the bag is in the pulling or carrying mode.

SUMMARY OF THE INVENTION

According to one aspect of the invention there is provided an apparatus comprising a bag having a base adapted to receive a ground rolling device, and the ground rolling device being detachably connectable with the base and comprising an axle provided with a wheel at or adjacent to each end such that when the ground rolling device is connected to the base the wheels project laterally from either side of the base.

According to this aspect of the invention, it is possible to provide a bag having a readily removable ground rolling device at the base of the bag, such that the golf bag can be pulled or pushed along on the wheels or carried by the golfer with or without the wheels attached.

In a preferred embodiment of the invention, the axle is received within a channel which extends from one side of the base to the other, such that when the axle is connected to the base the wheels project beyond the edges of the base.

In a preferred embodiment of the invention, the channel is a recess formed in the underside of the base. There are a number of suitable ways in which the axle can be retained within this recess, such as, for example, the axle can be retained as a result of "snap-fit" mechanism between the axle and the recess, although preferably the axle is retained by a latch/clip.

In an alternative embodiment of the invention, a rod extends through the base such that respective opposite ends of the rod project laterally beyond respective opposite openings of the base and then one or more wheels can be connected to the projecting ends of the rod.

In a further preferred embodiment of the invention, the axle is provided with an axle supporting tube, referred to as a plain bearing.

When the ground rolling device is connected to the base, if the bag is to be placed in a free-standing position, there is a need for a means of stabilizing the bag. Preferably, therefore, a downwardly projecting support element, which projects from the underside of the base, is provided to perform such function. This support element extends downwardly to substantially the same level as the lowest point of the wheels when these are connected, such that when the bag is in an upright position the bag is balanced on both the support element and the wheels. Even more preferably, this element is provided in a position on the underside of the base in such a way so as to place the center of gravity of the loaded or unloaded bag on the central, vertical axis of the bag.

This support element is preferably in the form of a footplate which is moveable between an open downwardly extended position when the bag is free-standing or a closed substantially flat position in which the footplate is secured in a parallel position to the underside of the base when the bag is being carried or pulled. The footplate can therefore be described as being a "fold-away" element.

With wheels and footplate attached, when the bag in an upright position it is raised off the ground by approximately 50 mm. A spring foot that is connected to the stand support rods is depressed by contact with the ground as a result of rocking the bag forward. This depression causes the stand support rods to flex the stand support legs outwards and in this open position the bag can be supported at an angle on these legs. With the elevation in the height of the bag above the ground as a result of the attachment of the wheels and footplate, an extension to the spring foot is preferably provided. This extension eliminates the requirement to rock the bag too far forward in order to ensure that the spring contacts the ground as the extension extends the length of the spring foot. It is preferable that this extension can be returned to normal foot height when the bag is in "carry bag" mode, i.e., when wheels are removed and the foot plate is collapsed into the base.

In a preferred embodiment of the invention, the wheels are fitted with plain bearings (referred to as "life-long bearings") and a hub cap that can prevent entry of foreign debris, e.g., grass and mud, into the wheels, causing mechanical failure.

In a further preferred embodiment of the invention, the bag is further provided with a handle in an upper region of the bag. The handle is extendable from a non-extended position.

Preferably, the handle comprises a shaft and an ergonomically designed hand-grip. Preferably, at least part of the shaft is telescopic, thereby allowing the handle to be extended to any desired height. This is considered particularly advantageous if the same bag is being used by golfers of varying heights.

In a further preferred embodiment of the invention, at least part of the handle is rotatable relative to the vertical axis of the bag. This rotation allows an increased degree of movement of the bag in the pulling mode, ensures that the bag is responsive to small movements by the golfer, and also improves the stability of the bag as it is maneuvered around bends or over rough terrain. There is a reduced risk of the bag become unstable as it is moved and toppling over.

The shaft of the handle is preferably located within a channel or tube molded into the bag, and, even more preferably, the channel or tube extends at least part of the height of the bag. Preferably, this channel or tube extends from the base.

In a further embodiment of the invention, the bag is provided with a dual-strap that is conventionally used for satchels and that enables the golfer to carry the bag and displace the weight of the bag equally across his back and shoulders.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
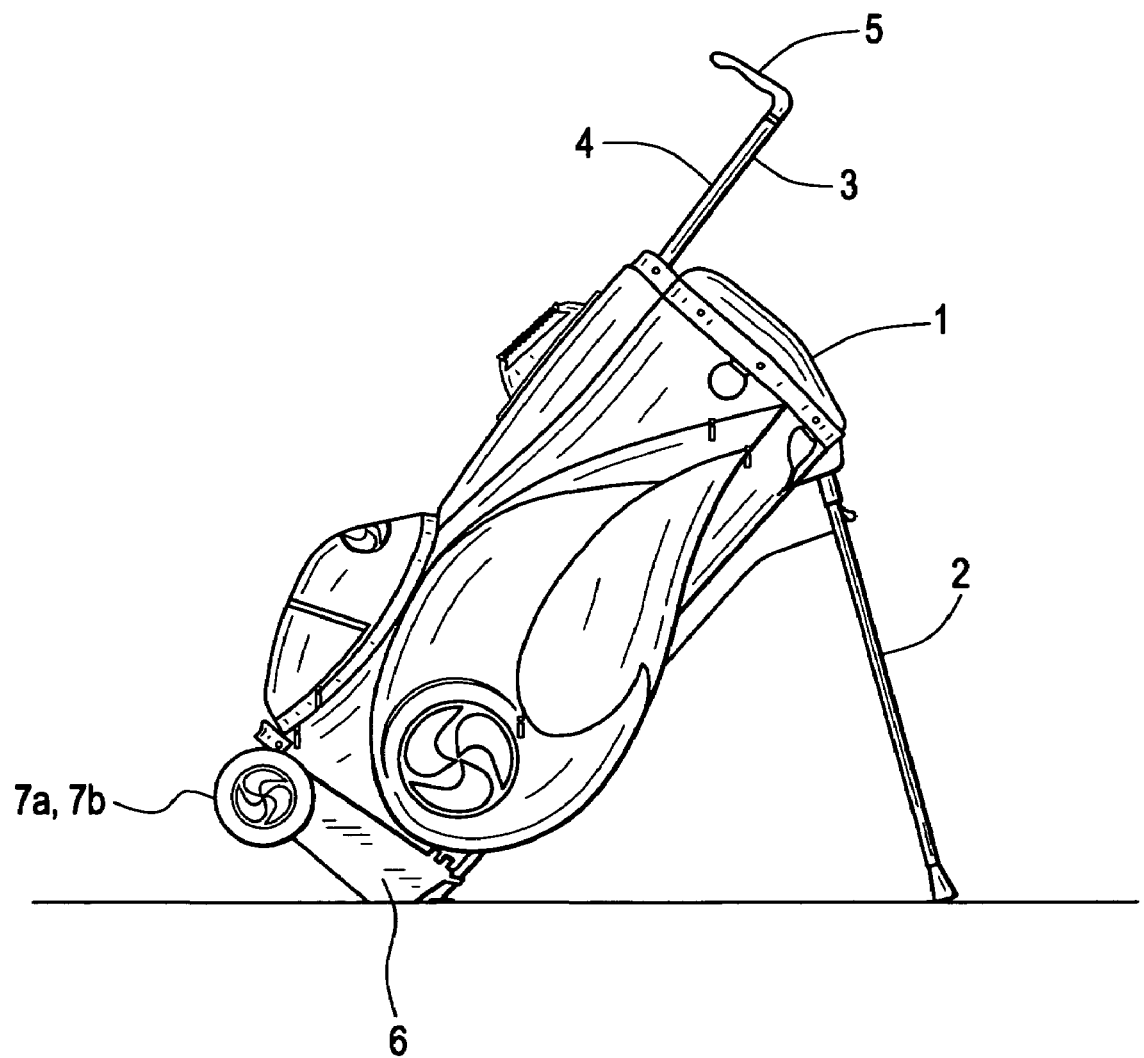
FIG. 1 illustrates a perspective view of one version of the golf bag with removable wheels, in accordance with an exemplary embodiment of the present invention.

Referring to FIG. 1, a golf bag 1 that has the same dimensions as a standard lightweight carry bag comprises conventional supporting legs 2 for supporting the bag 1 when not being supported by the golfer, and which can be stored flat against the bag when not in use. The golf bag 1 includes a handle 3 comprising a shaft 4 and a hand-grip 5 extending substantially perpendicular to the shaft 4 and being extendable from a non-extended position. The golf bag 1 includes a base 6, and two wheels 7a and 7b removably detachable with the base.

Figure 2A:
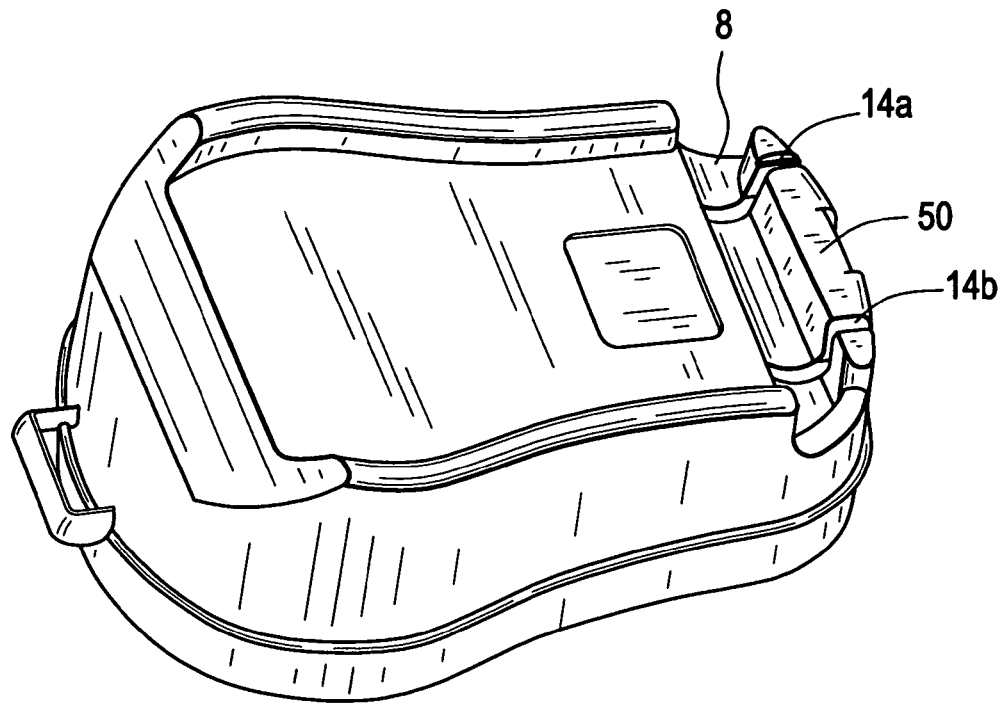
FIGS. 2A and 2B illustrate perspective views of the underside of the base of the golf bag, in accordance with an exemplary embodiment of the present invention.
Figure 2B:
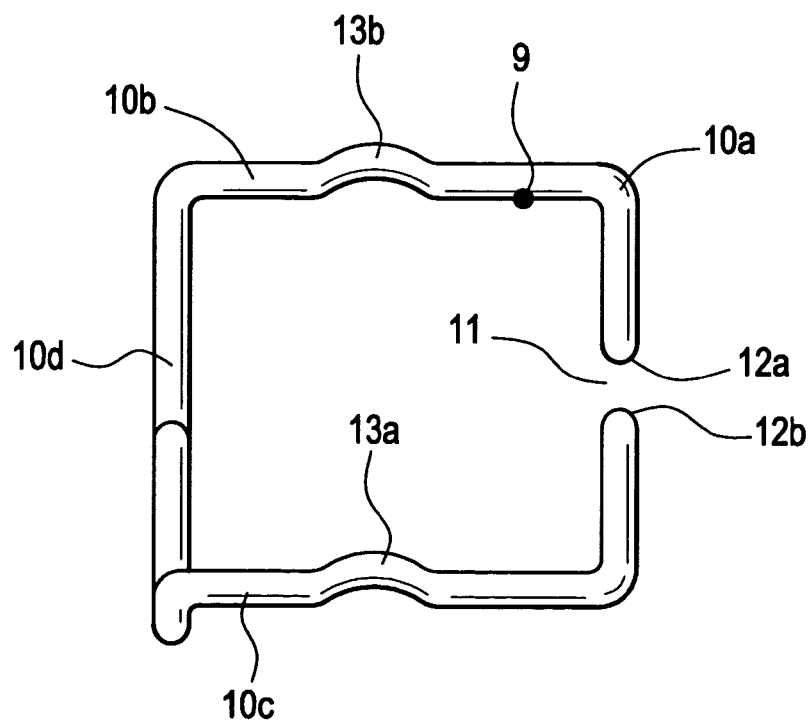

Referring to FIG. 2A, the underside of the base 6 is shown with a channel-shaped recess 8 extending across the width of the base 6. The recess 8 is formed adjacent to one of the shorter sides of the base 6. An axle (e.g., used for removably attaching wheels 7a and 7b to the base 6) is received into the recess 8 and secured by a substantially square metal clip 9 that is illustrated in FIG. 2B. The clip 9 has four sides (10a-d), with an aperture 11 being provided within the middle of one side (e.g., 10a) to form free ends 12a and 12b. These free ends 12a, 12b are the point at which the clip 9 is attached to the base 6. In such an embodiment, the clip 9 is shown as being centrally located on the base 6, although a plurality of smaller clips can be provided. The clip 9 is pivotable about its point of attachment on the base 6 and this enables the clip 9 to be moved downwards and positioned perpendicularly across the axle which is located within the recess 8. The sides of the clip 10b and 10c that extend perpendicular to side 10a are provided with central upwardly arched regions 13a and 13b, respectively. These arched regions 13a, 13b are located above the axle and urge the axle in to the recess 8 when the clip 9 is in use. As the provision of the recess 8 results in a ridge 50 (as illustrated in FIG. 2A) being formed at the periphery of the base 8, channels 14a and 14b are provided in the ridge 50 to allow the sides 10b and 10c to extend through the ridge 50.

Figure 3:
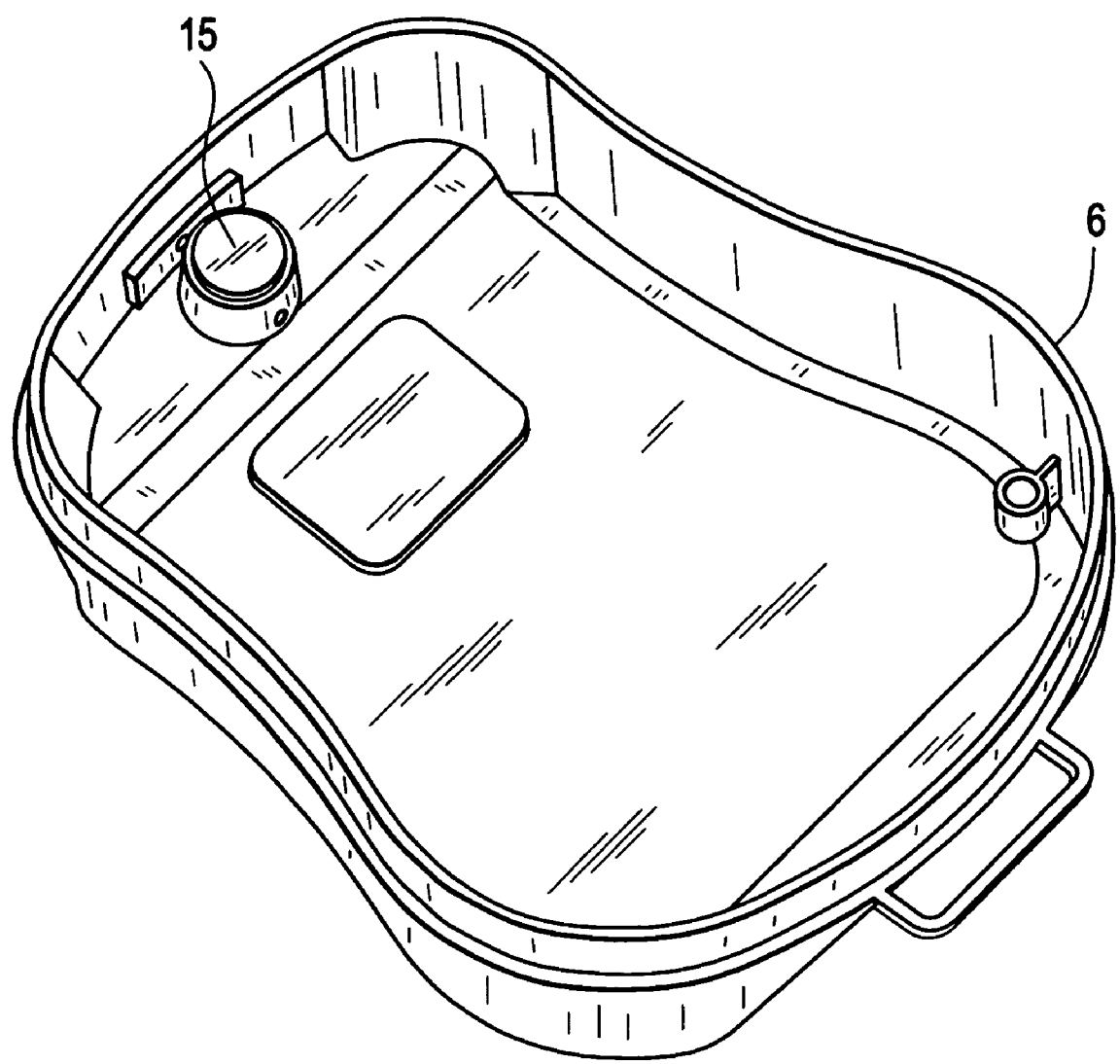
FIG. 3 illustrates a perspective of the inside of the base of the golf bag, in accordance with an exemplary embodiment of the present invention.

FIG. 3 illustrates the inner surface of the base 6 that has a molded spigot 15 for receiving the shaft of the handle (not shown). The shaft fits over the spigot 15 and can be glued or otherwise suitably attached and pinned in place. This spigot 15 is centrally located above the recess 8 provided on the underside of the base 6.

Figure 4:
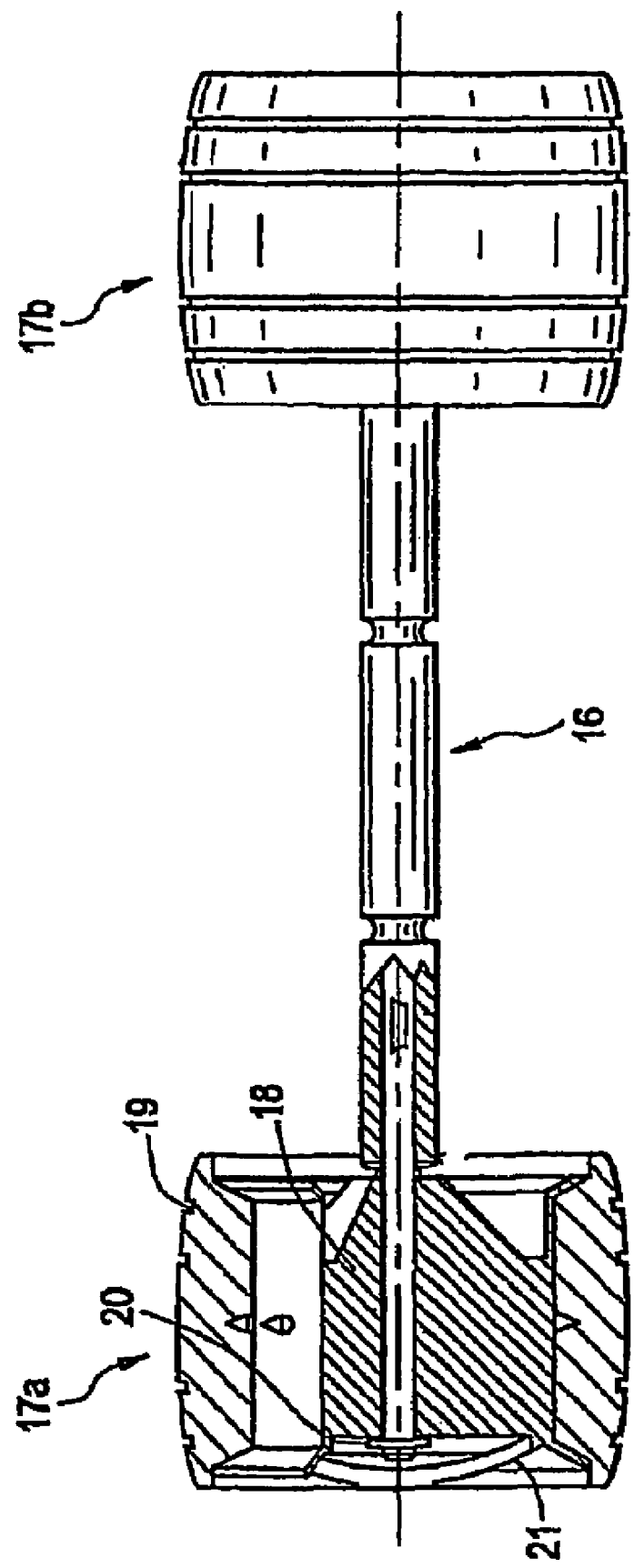
FIG. 4 illustrates a schematic of the axle and wheel assembly, in accordance with an exemplary embodiment of the present invention.

The removable axle and wheel unit is illustrated in FIG. 4. The axle 16 can be molded from a plastic material or the like. The axle 16 is shown with wheels 17a and 17b located at opposing ends of the axle 16. Each wheel 17a, 17b comprises a wheel hub 18, a tire 19, a spring washer 20 and a hub cap 21. An approximately 1 mm gap between the axle 16 and the hub 18 can be provided to enable the free rotation of the wheel 17a, 17b.

Figure 5B:
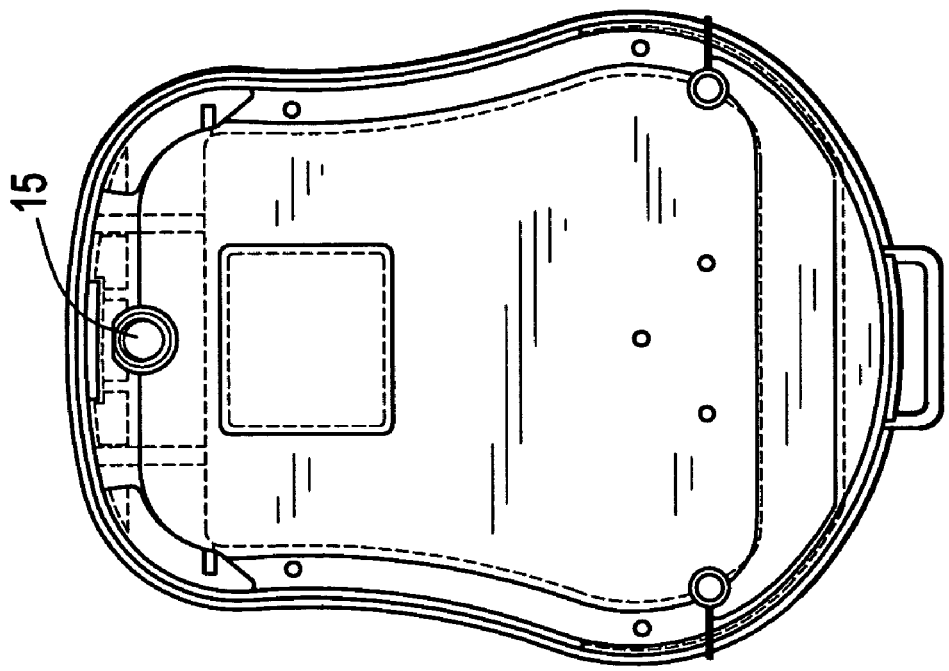
FIGS. 5A and 5B illustrate a schematic of the top view of the golf bag and the base of the golf bag, respectively, in accordance with an exemplary embodiment of the present invention.
Figure 5A:
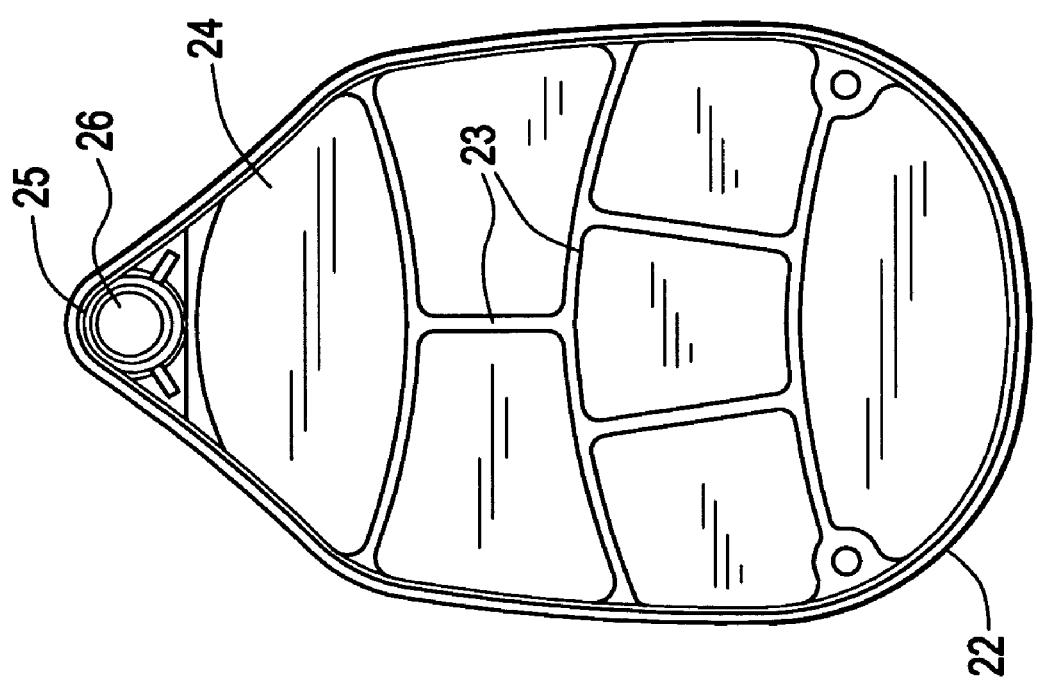

As illustrated in FIG. 5A, the body portion 22 of the golf bag 1 in which the golf clubs are retained can be molded as a single unit from a rigid plastic material. The body portion 22 takes the form of a substantially hollow cylinder into which the golf clubs are placed vertically with the heads of the clubs protruding out the top of body portion 22. FIG. 5A illustrates the top view of the body portion 22 and shows ribs 23 of a plastic material or the like dissecting the cylinder in a range of directions so as to form varying shaped and sized compartments 24 designed to accommodate an array of different clubs. The rigidity of the cylinder prevents the golf bag from twisting under load and when being towed.

The body portion 22 is molded so as to have an apical region 25 that houses a substantially circular shaft 26 into which the shaft 4 of the handle 3 is inserted.

As illustrated in FIG. 5B, the interior surface of the base 6 is molded to incorporate the molded spigot 15 for receiving the end portion of the shaft 4 of the handle 3. Thus, when the base 6 and body portion 22 are connected together, an integrally molded shaft for receiving the shaft 4 of the handle 3 is formed. The outer tube is molded into the head and into the base 6 in order to create a stiff dynamic structure.

Figure 6A:
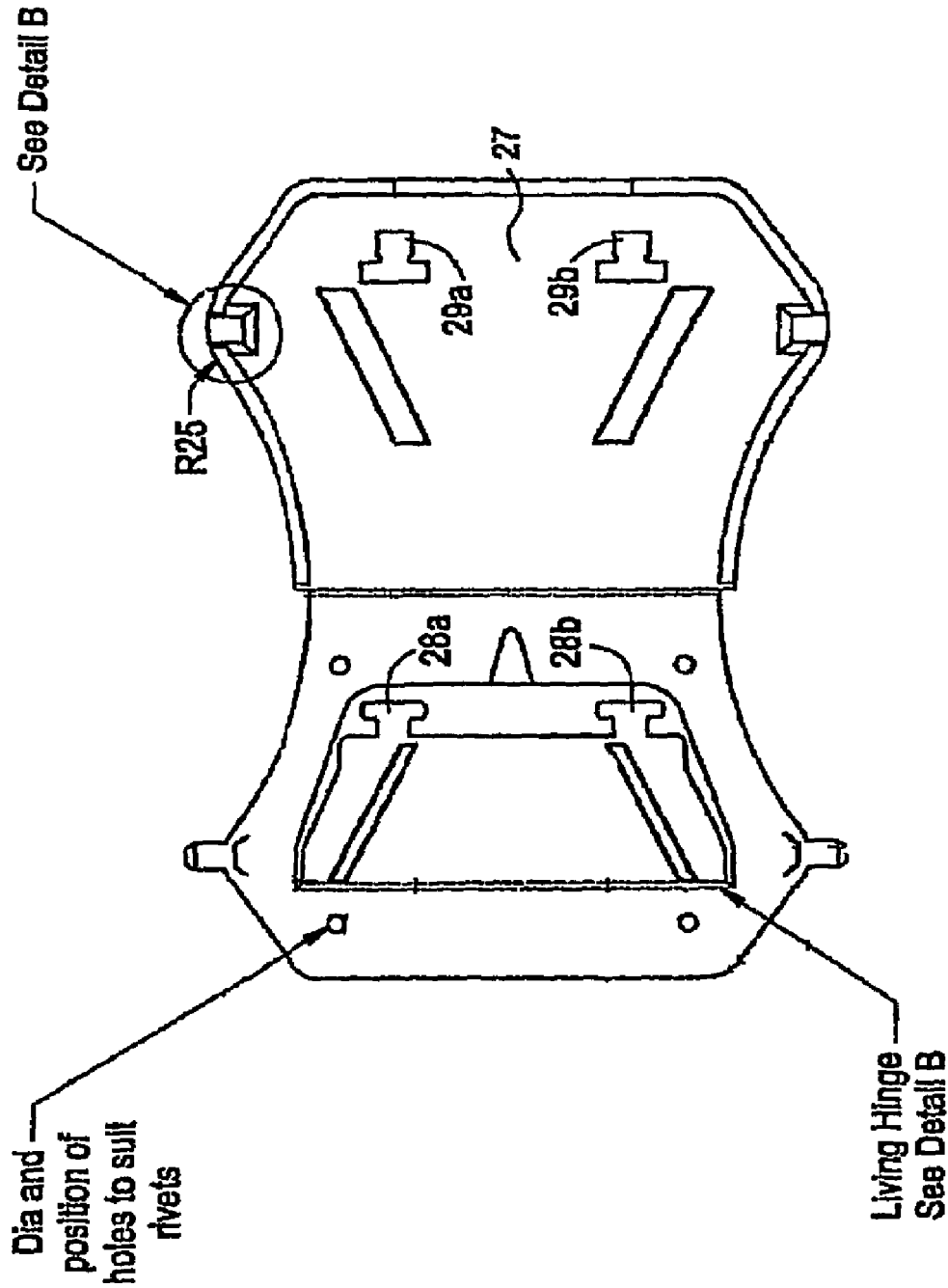
FIGS. 6A and 6B illustrate the foot plat structure and its actuation, in accordance with an exemplary embodiment of the present invention.
Figure 6B:
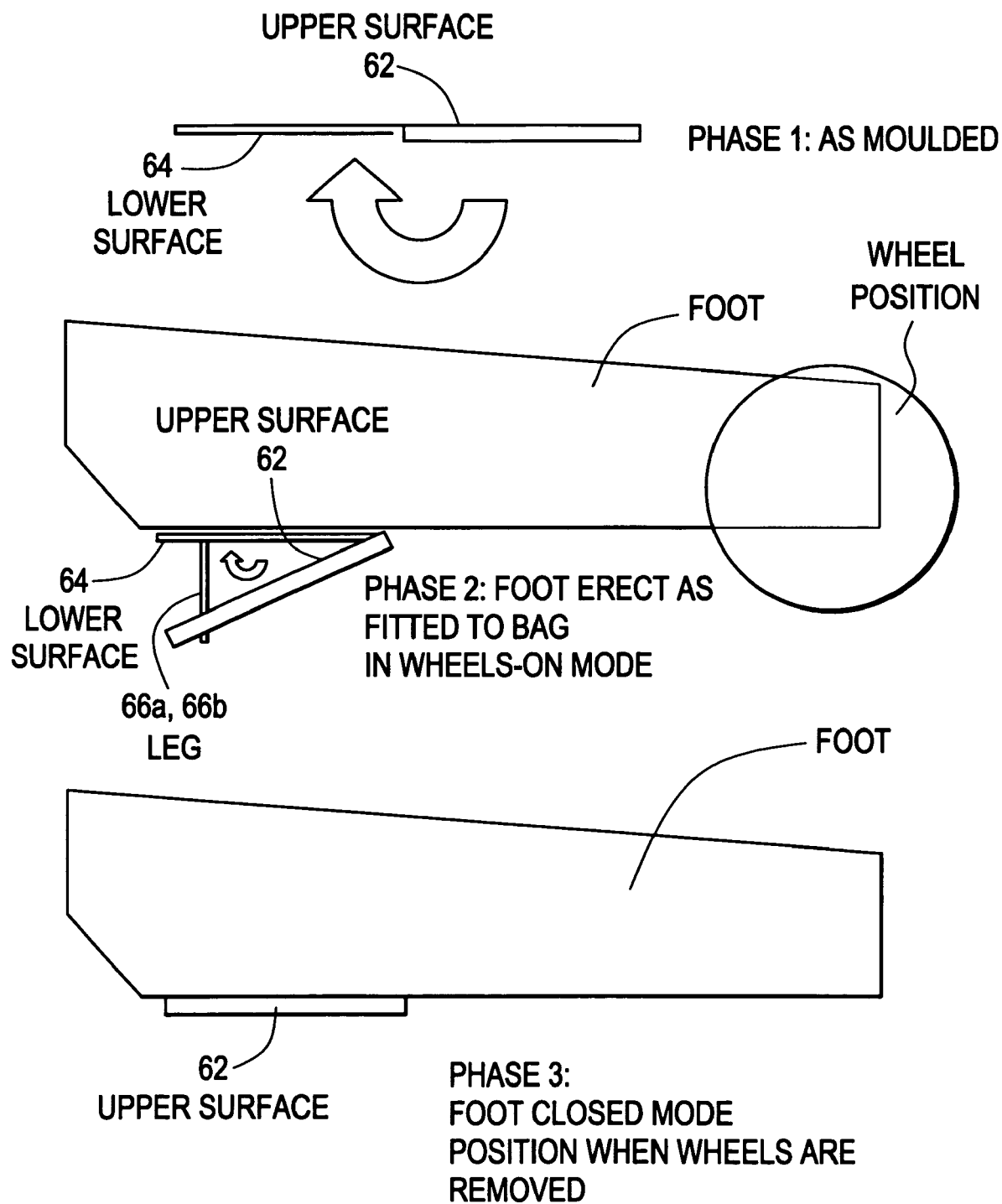

FIGS. 6A and 6B illustrate the footplate 27. FIG. 6A illustrates the mechanism of action of the footplate 27, and FIG. 6B illustrates the operation of the foot plate 27. The footplate 27 is a "live hinge." As illustrated in FIG. 6B, when attaching the wheels 7a and 7b, the golfer can unclip the upper surface 62 of the foot plate 27 and rotate it, thereby allowing the legs 66a, 66b to be erected from a flat position. The "T" heads 28a, 28b on the legs 66a, 66b can be positioned in holes 29a, 29b on the upper surface 62 and then "clicked" into place, holding the lower surface 64 in an elevated position and hence providing the foot. After the wheels 7a, 7b are removed, the cycle is reversed to stow the lower surface 64 inconspicuously under the base 6 of the golf bag 1.

Figure 7:
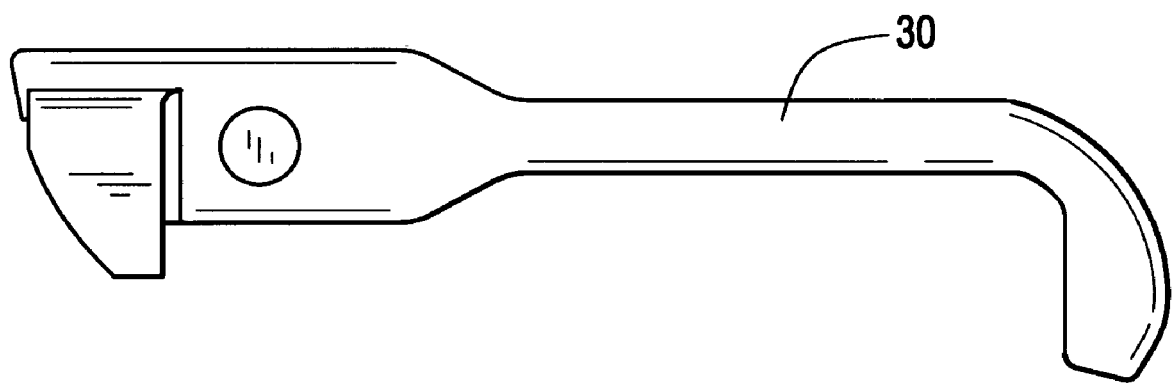
FIG. 7 illustrates the foot extension, in accordance with an exemplary embodiment of the present invention.
Figure 9A:
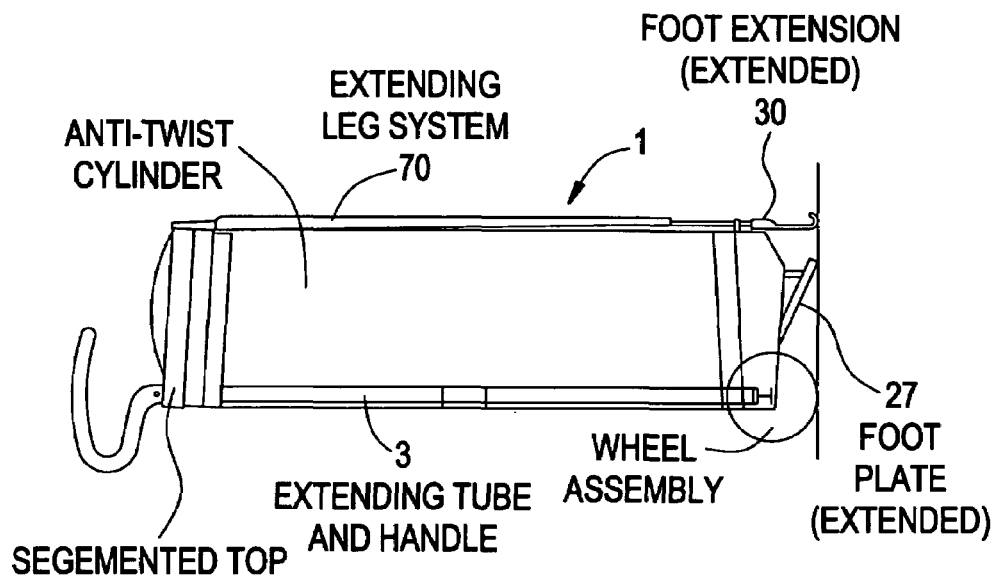
FIGS. 9A and 9B illustrate schematics of the internal structure of the golf bag, in accordance with an exemplary embodiment of the present invention.
Figure 9B:
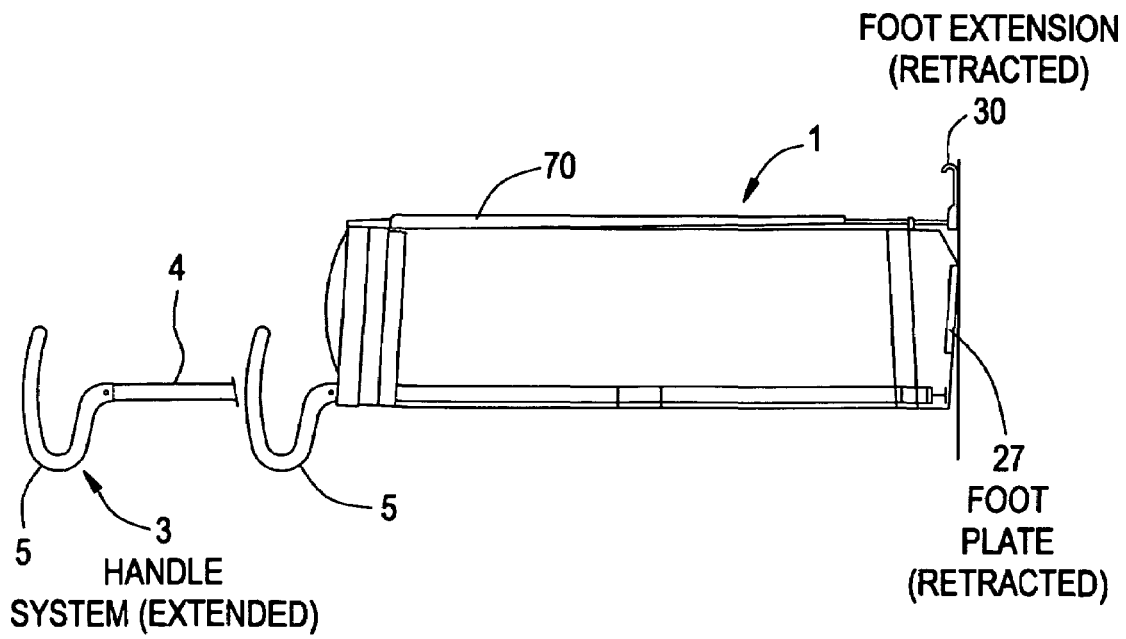

FIG. 7 illustrates the foot extension 30, and the operation of the foot extension 30 is illustrated in FIGS. 9A and 9B. When the wheel unit is attached to the base 6, the golf bag 1 is raised by about 50 mm from the ground. The foot extension 30 enables the leg actuation system 70 (illustrated in FIGS. 9A and 9B), which is conventional to golf bags, to remain effective even when the base 6 is raised above the ground and the length of the conventional spring element used to actuate the legs is of insufficient length. As illustrated in FIG. 9A, the foot extension 30 is fitted to the lower part of the leg actuation system 70 and preferably clips on to the existing leg actuation system 70 through a suitably molded slot system such that it can be pivoted towards the ground. Since the foot extension 30 is of sufficient length to contact the ground, the foot extension 30 can replace the function of the spring element. As illustrated in FIG. 9A, the foot extension 30 is the spring foot and can swivel, clicking into place, to act as an extension. Alternatively, as illustrated in FIG. 9B, the foot extension 30 can swivel back to an un-extended position where it performs (e.g., a balancing or support function), at an appropriate length, to suit a wheel-less bag. The foot extension 30 is preferably manufactured from a plastic material or other suitable material.

Figure 8:
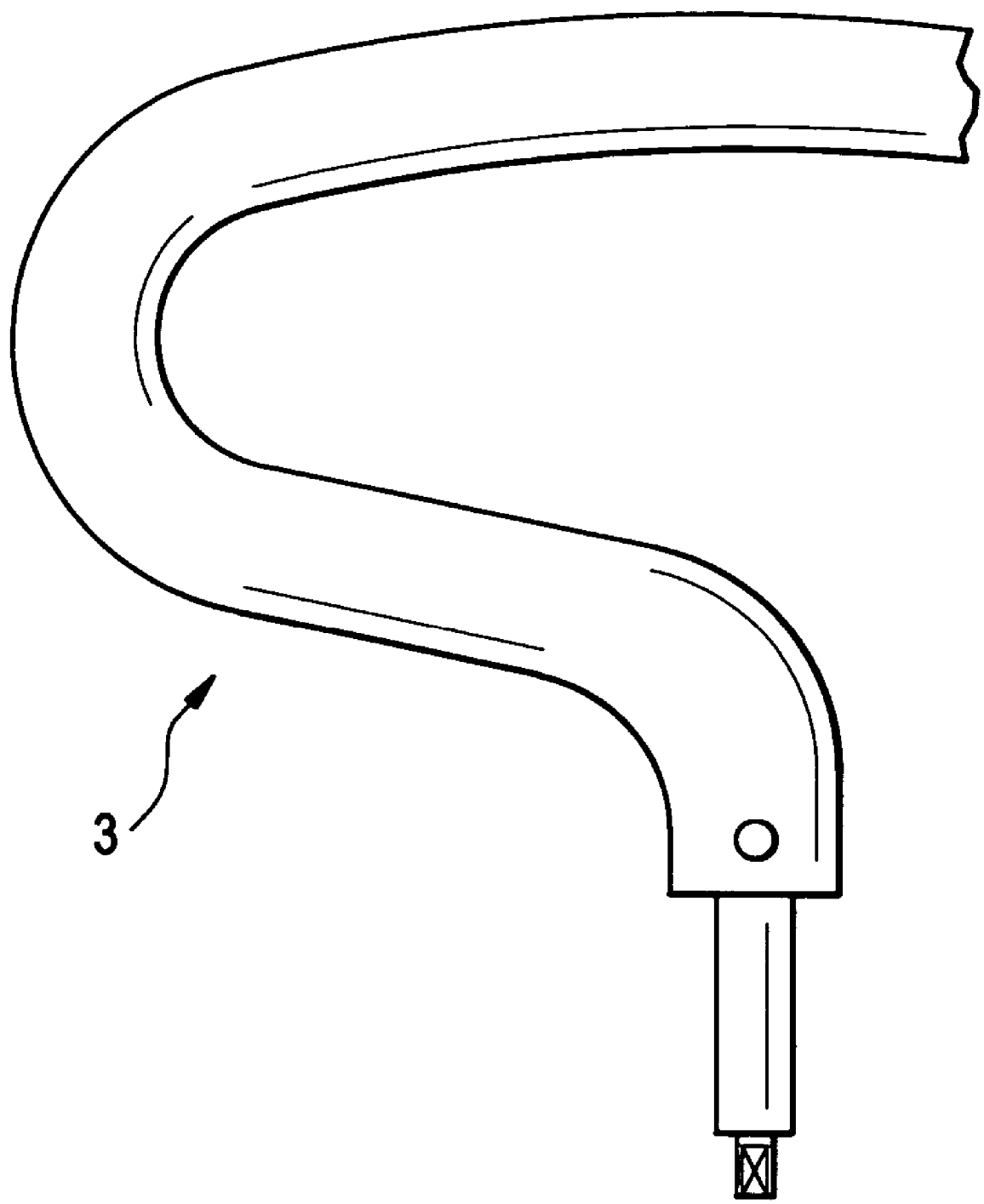
FIG. 8 illustrates the hand-grip, in accordance with an exemplary embodiment of the present invention.

FIG. 8 illustrates the swan neck shape of the handle 3.

FIGS. 9A and 9B illustrate schematics of the internal structure of the golf bag 1.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents and applications, and publications discussed above are hereby incorporated herein by reference in their entireties.

What is claimed is:

1. An apparatus, comprising:
a bag,
   wherein the bag includes a base adapted to receive a ground rolling device;
   wherein the ground rolling device is detachably connectable with the base;
   wherein the ground rolling device comprises:
      an axle provided with a wheel at or adjacent each end of the axle such that when the ground rolling device is connected to the base the wheels project laterally from either side of the base;
   wherein the axle is received within a channel that extends from one side of the base to an other side such that when the axle is connected to the base the wheels project beyond edges of the base; and
   wherein the channel comprises a recess formed in an underside of the base.

2. The apparatus of claim 1, wherein a retaining means is provided to retain the axle within the recess.

3. The apparatus of claim 2, wherein the retaining means comprises a latch that extends across the axle within the recess.

4. The apparatus of claims 1, wherein the axle is provided with an axle supporting tube.

5. The apparatus of claim 1, wherein the base comprises:
a downwardly projecting support element,
   wherein the support element extends downwardly to substantially the same level as a lowest point of the wheels when the wheels are connected, such that when the bag is in an upright position the bag is balanced on the support element and the wheels.

6. The apparatus of claim 1, wherein bag comprises:
a spring foot configured to facilitate opening of a pair of legs when the spring foot is depressed against the ground, and
   wherein a means for extending the spring foot towards a ground level is provided for when the ground rolling device is connected to the base.

7. The apparatus of claim 1, wherein the bag comprises:
a handle located in an upper region of the bag, and
   wherein the handle is extendable from a non-extended position.

8. The apparatus of claim 7, wherein the handle comprises a shaft and a hand-grip.

9. The apparatus of claim 8, wherein at least part of the shaft is telescopic.

10. The apparatus of claim 7, wherein at least part of the handle is rotatable relative to the vertical axis of the bag.

11. The apparatus of claim 8, wherein the shaft of the handle is located within a molded channel that extends at least part of the height of the bag, and wherein the shaft is rotatable within the molded channel.

12. The apparatus of claim 11, wherein the molded channel extends from the base of the bag.

13. The apparatus of claim 1, wherein the bag comprises a golf bag.

14. A ground rolling device that is detachably connectable to a base of a golf bag, the ground rolling device comprising:
   an axle provided with a wheel at or adjacent each end of the axle,
wherein when the ground rolling device is connected to the base the wheels project laterally from either side of the base;
   wherein the axle is received in a channel provided in the base of the golf bag; and
   wherein the channel comprises a recess formed in an underside of the base.

15. A golf bag, comprising:
a base adapted to receive a ground-rolling apparatus,
   wherein the ground-rolling apparatus is configured to be detachably connectable with the base, and
   wherein the ground-rolling apparatus comprises:
      an axle provided with wheels located substantially at each end of the axle,
   wherein when the ground-rolling apparatus is connected to the base, the wheels project laterally from either side of the base;
   wherein the axle is received within a channel that extends from a first side of the base to a second side of the base, and
   wherein when the axle is connected to the base, the wheels project beyond the first and second sides of the base; and
   wherein the channel comprises a recess formed in an underside of the base.

16. The golf bag of claim 15, wherein the base comprises:
a support element,
   wherein the support element is configured to extend towards ground level to substantially the same level as a lowest point of the wheels when the wheels are detachably connected to the base via the axle, and
   wherein when the golf bag is in an upright position, the golf bag is balanced on the support element and the wheels.

17. The apparatus of claim 15, wherein the bag comprises:
a spring foot configured to facilitate opening of a pair of legs connected to the golf bag when the spring foot is depressed against the ground, and
   wherein a means for extending the spring foot towards a ground level is provided when the ground rolling device is connected to the base.

* * * * *